United States Patent [19]

Kataoka

[11] Patent Number: 4,840,447
[45] Date of Patent: Jun. 20, 1989

[54] LIGHT MODULATING DEVICE ARRAY

[75] Inventor: Keiji Kataoka, Kawagoe, Japan

[73] Assignee: Hitachi, Ltd., Tokyo, Japan

[21] Appl. No.: 95,616

[22] Filed: Sep. 10, 1987

[30] Foreign Application Priority Data

Sep. 10, 1986 [JP] Japan ............................. 61-211563

[51] Int. Cl.⁴ .......................... G02B 6/10; G02F 1/00
[52] U.S. Cl. ................................. 350/96.14; 350/96.13
[58] Field of Search ...................... 350/96.11–96.14, 350/96.15

[56] References Cited

U.S. PATENT DOCUMENTS

| H353 | 10/1987 | Taylor | 350/96.14 X |
| 4,364,633 | 12/1982 | Verber et al. | 350/96.14 |

FOREIGN PATENT DOCUMENTS

| 57-168234 | 10/1982 | Japan | 350/96.14 |
| 59-226310 | 12/1984 | Japan | 350/96.15 |

*Primary Examiner*—John D. Lee
*Assistant Examiner*—John Ngo
*Attorney, Agent, or Firm*—Antonelli, Terry & Wands

[57] ABSTRACT

A light modulating device array formed in a surface of a crystal plate with an electrooptic effect includes an optical input coupling waveguide portion receiving a laser beam from a laser source, a tapered waveguide array portion for dividing a light beam from the optical input coupling waveguide portion into a plurality of parts, and a plurality of light modulating parts juxtaposed in a predetermined direction and receiving light beams from the tapered waveguide array portion. Each of the light modulating parts includes an input waveguide portion and a pair of modulating waveguide portions formed by bifurcating the input waveguide portion, so as to form a Mach-Zehnder type waveguide structure. Further, each light modulating part includes electrodes for controlling the modulating waveguide portions, to vary the intensity of light outputted from the light modulating part, in accordance with a voltage applied to each electrode. Selected ones of the electrodes includes in this array are connected to each other, to prevent adjacent light modulating parts from interacting on each other.

10 Claims, 5 Drawing Sheets

LIGHT MODULATING DEVICE ARRAY

CROSS-REFERENCES TO THE RELATED APPLICATIONS

This application relates to a U.S. application Ser. No. 798,432 filed by Keiji KATAOKA and Akira ARIMOTO on Nov. 15, 1985, entitled "Method and Apparatus for Generating Optical Information" and assigned to the present assignee, now U.S. Pat. No. 4,750,815.

BACKGROUND OF THE INVENTION

The present invention relates to a light modulating device including a waveguide structure, and more particularly a light modulating device array suitable for use in an optical information generating apparatus such as a laser printer.

A conventional light modulating device usually includes only one light modulating part. FIG. 2 shows the conventional light modulating device. Referring to FIG. 2, optical waveguides 1, 2, 3 and 4 are formed by diffusing titanium in the surface of a LiNbO$_3$ crystal 7, and a laser beam 9 is directed to the optical waveguide 1 through a lens 8. Light having passed through the optical waveguide 1 is divided into two parts, which pass through the optical waveguides 2 and 3. In other words, the optical waveguide 1 is bifurcated at the end thereof. Light beams having passed through the optical waveguides 2 and 3 are combined by the optical waveguide 4, that is, the optical waveguides 2 and 3 meet each other at the head of the optical waveguide 4. The combined light beam passes through the optical waveguide 4, and then leaves the crystal 7. When the length of the optical guide 2 between the end of the optical waveguide 1 and the head of the optical waveguide 4 is made equal to that of the optical waveguide 3, the light beams having passed through the optical waveguides 2 and 3 are in phase with each other at the head of the optical waveguide 4, and thus a laser beam emerges from the crystal 7 with a strong intensity. Electrodes 5 and 6 are provided on the optical waveguides 5 and 6, respectively. When a voltage is applied between the electrodes 5 and 6, an electric field is established in the crystal 7 between the electrodes 5 and 6 so that the electric field at the optical waveguides 2 and 3 is perpendicular to the surface of crystal 7, that is, parallel or anti-parallel to a Z-direction, and the direction of the electric field at the optical waveguide 2 is opposite to the direction of the electric field at the optical waveguide 3. Accordingly, when the crystal 7 is a Z-cut plate of LiNbO$_3$, the electrooptic constant r$_{33}$ having a large value is utilized, and the phase difference between two light beams at the head of the optical waveguide 4 can be made equal to $\pi$ (namely, 180°) by applying a relatively low voltage between the electrodes 5 and 6. When the phase difference at the head of the optical waveguide 4 is made equal to $\pi$ as mentioned above, the combined light beam becomes weak as a result of interference of two light beams. The conventional light modulating device can modulate incident light in the manner mentioned above, and thus is considered to be a light modulating device provided with a Mach-Zehnder type waveguide structure. As has been already mentioned, the conventional light modulating device includes only one light modulating part. When a plurality of light modulating devices each corresponding to the conventional device are combined to form an array, there arise the following problems. That is, it is not easy to impart incident light efficiently to a plurality of light modulating parts. Further, the leakage of an electric field from a light modulating part supplied with a voltage to another light modulating part adjacent thereto may cause a false operation.

SUMMARY OF THE INVENTION

It is accordingly an object of the present invention to provide a light modulating device array which can solve the above problems and can operate with high efficiency and high reliability.

In order to attain the above object, according to an aspect of the present invention, there is provided a light modulating device array formed in a surface of a crystal plate with an electrooptic effect, which array comprises: an optical input coupling waveguide receiving a laser beam from a laser source; an array of tapered waveguides arranged in parallel, each for passing a light beam from the optical input coupling waveguide towards its narrow end (path); and a plurality of light modulating portions juxtaposed in a predetermined direction and receiving light beams from the tapered waveguide array, each light modulating portion including an input waveguide coupled to said narrow end of the tapered waveguide, a pair of waveguides formed by bifurcating the input waveguide, and electrodes provided on the pair of waveguides, those electrodes on facing waveguides of adjacent light modulating portions being supplied with the same potential.

Further, according to another aspect of the present invention, there is provided a light modulating device array formed in a surface of a crystal plate with an electrooptic effect which array comprises: an optical input coupling waveguide receiving a laser beam from a laser source; an array of tapered waveguides arranged in parallel, each passing a light beam from the optical input coupling waveguide towards its narrow end; and a plurality of light modulating parts juxtaposed in a predetermined direction and receiving light beams from the tapered waveguide array individually, each light modulating portion including an input waveguide, a pair of modulating waveguides formed by bifurcating the input waveguide and electrodes disposed alternately with the modulating waveguides for controlling the modulating waveguides, respective ones of said electrodes disposed between adjacent light modulating portions being all supplied with the same potential.

DESCRIPTION OF THE PREFERRED EMBODIMENTS

Figure 1:
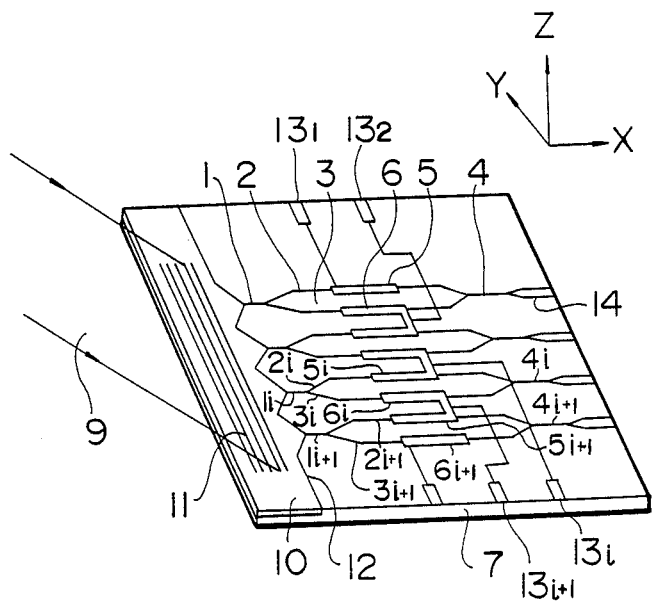
FIG. 1 is a schematic diagram showing an embodiment of a light modulating device array according to the present invention.
Figure 2:
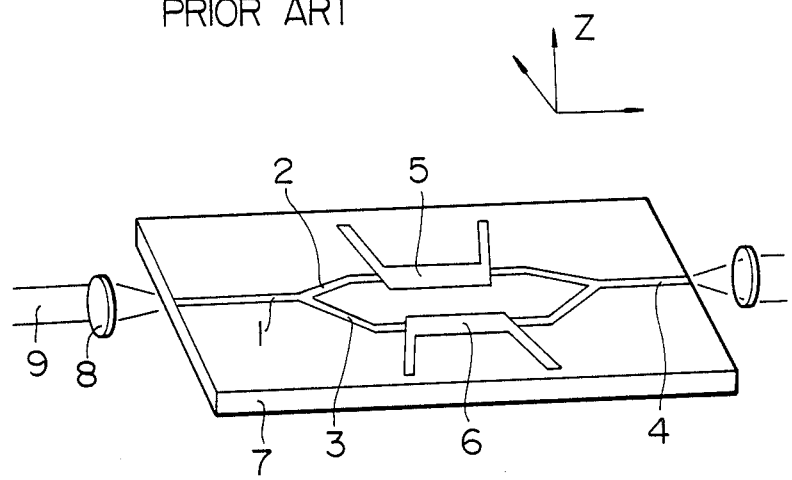
FIG. 2 is a schematic diagram showing a conventional light modulating device, which includes only one light modulating part.

Explanation will be made of an embodiment of a light modulating device array according to the present invention, with reference to FIG. 1. Referring to FIG. 1, an optical waveguide is formed by diffusing titanium in a surface of a Z-cut $LiNbO_3$ crystal plate 7, and an optical input coupling waveguide portion 10 is provided with a grating 11, which is irradiated with a uniformly extended laser beam 9. The laser beam 9 incident upon the grating 11 passes through the coupling waveguide portion 10, and is then divided by a tapered waveguide array portion 12 into a plurality of parts, which are led to respective input waveguide portions $1i$ of a plurality of light modulating parts (where i=1, 2, 3, —and so on).

Figure 3A:
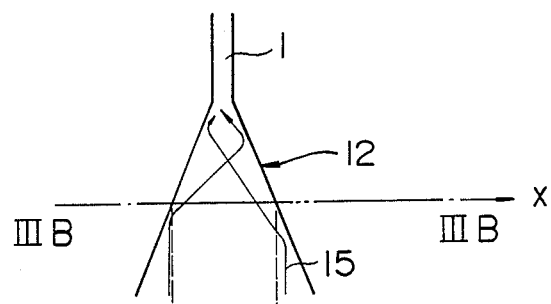
FIG. 3A is a schematic diagram for explaining the operation of the tapered waveguide shown in FIG. 1.
Figure 3B:
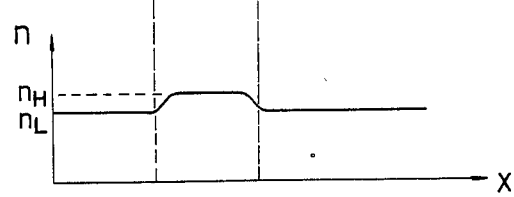
FIG. 3B is a diagram showing the refractive index distribution along the line IIIB—IIIB of FIG. 3A.

Now, the operation of the tapered waveguide array portion 12 will be explained, with reference to FIGS. 3A and 3B. FIG. 3A shows one tapered waveguide of FIG. 1, and FIG. 3B shows the refractive index distribution along the line IIIB—IIIB of FIG. 3A. That region of the crystal plate 7 where titanium is diffused, has a high refractive index $n_H$, and that region of the crystal plate 7 where titanium is not diffused, has a low refractive index $n_L$. Further, the refractive index varies gradually at the boundary between the Ti-diffused region and the non-diffused region. Accordingly, light 15 led to the tapered waveguide 12 is smoothly reflected from the above boundary, as shown in FIG. 3A, that is, confined within the tapered waveguide, and thus is led efficiently to the input waveguide portion 1 without escaping to the outside.

Referring back to FIG. 1, light led to the input waveguide portion $1i$ is divided in two parts, which pass through modulating waveguide portions $2i$ and $3i$ formed by bifurcating the input waveguide portion $1i$, and then reach an output waveguide portion $4i$. Electrodes $5i$ and $6i$ are provided on the modulating waveguide portions $2i$ and $3i$, respectively, and are supplied with voltages from electrode pads $13_1$, $13_2$—$13_i$ for wire bonding. That part of the output waveguide portion $4i$ which exists in the vicinity of an end face of the crystal plate 7, is enlarged, that is, has the form of a tapered waveguide. This is because light emerging from a wide waveguide portion is diffracted within a small angle, and thus can be easily transmitted to the following parts by an external optical system without the loss of light energy caused by vignetting of light.

Now, explanation will be made of the feature of the electrode structure of the present embodiment, with reference to FIGS. 4A and 4B. In the present embodiment, confronting electrodes $5i$ and $6i$ 1 adjacent light modulating parts are connected with each other. Accordingly, no electric field is formed between adjacent light modulating parts. That is, even when a voltage is applied between the electrodes $5i$ and $6i$ of a light modulating part to drive the light modulating part, a light modulating part adjacent thereto is not affected by the applied voltage. In such an electrode structure, a voltage is applied to each electrode in accordance with a differential driving method. In more detail, when a light modulating part is to form a light point on a screen, the potential difference between the electrodes $5i$ and $6i$ of the light modulating part is made equal to zero. When the light modulating part is to form a dark point on the screen, a predetermined potential difference is applied between the electrodes $5i$ and $6i$ of the light modulating part.

Next, explanation will be made of an example of the operation of the present embodiment.

Figure 4A:
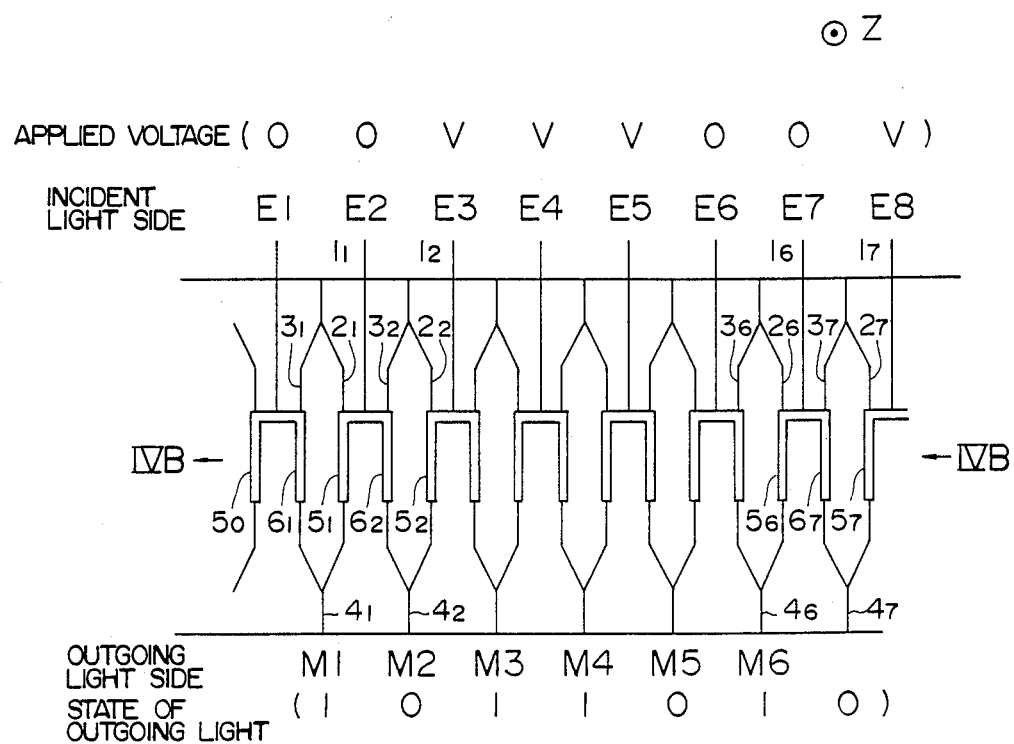
FIG. 4A is a schematic diagram for explaining the operation of the embodiment of FIG. 1.
Figure 4B:
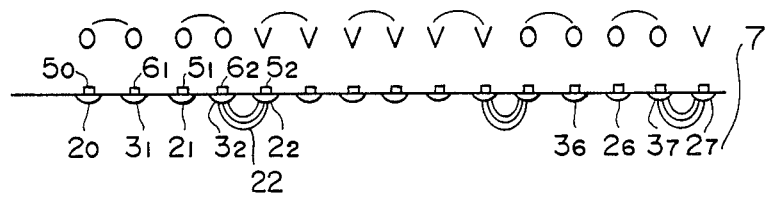
FIG. 4B is a diagram showing the generation of electric field based upon the electrode structure of FIG. 1, showing a section taken along with the line IVB—IVB of FIG. 4A.

Referring to FIG. 4A, let us consider a case where it is intended to deliver optical information "1011010" from respective ends $M_1$ to $M_6$ of the output waveguide portions $4_1$ to $4_6$ at the end face of the crystal plate 7. In the above optical information, reference numeral 1 designates light having a large intensity, and O light having a small intensity. In this case, a voltage pattern (O, O, V, V, V, O, O, V) is applied to electrode pads $E_1$ to $E_8$, as shown in FIG. 4A. FIG. 4B shows the cross section of the crystal plate 7 taken along the line IVB—IVB of FIG. 4A. As shown in FIG. 4B, the modulating waveguide portion $2i$ exists under the electrode $5i$ and the modulating waveguide portion $3i$ exists under the electrode $6i$. When confronting electrodes $5i$ and $6i$ 1 adjacent light modulating parts are connected with each other and the above-mentioned voltage pattern is applied to such an electrode structure, electric lines of force 22 are generated at a light modulating part whose electrodes $5i$ and $6i$ are different in potential from each other, and no electric line of force is generated at a light modulating part whose electrodes $5i$ and $6i$ have the same potential. The electric lines of force at each of the waveguide portions $2i$ and $3i$ are parallel to the direction of thickness of the crystal plate 7. The present embodiment uses the Z-cut $LiNbO_3$ crystal plate 7, the direction of thickness of which is parallel to a Z-axis. Accordingly, the present embodiment can utilize the electrooptic constant $r_{33}$ having a large value, and thus can modulate incident light by a relatively small voltage.

Figure 5:
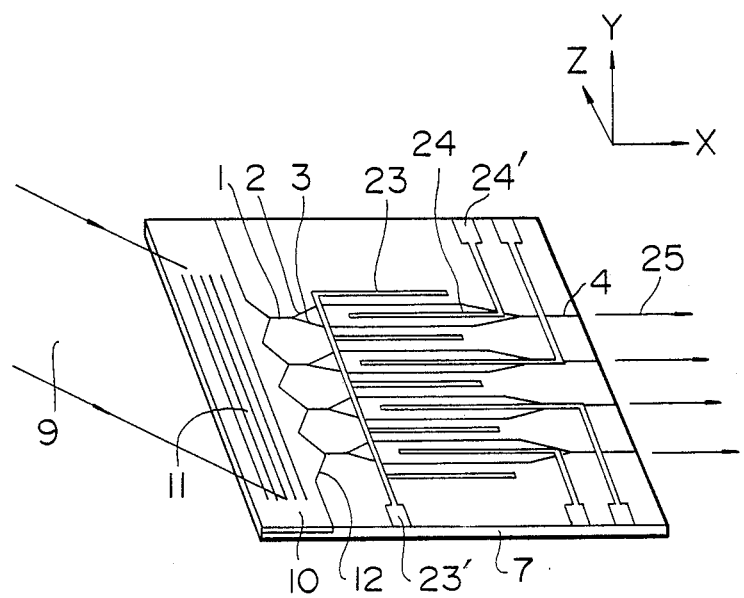
FIG. 5 is a schematic diagram showing another embodiment of a light modulating device array according to the present invention.

FIG. 5 shows another embodiment of a light modulating device array according to the present invention, in which embodiment a Y-cut $LiNbO_3$ crystal plate 7 is used. Referring to FIG. 5, a plurality of light modulating parts are arranged in a Z-direction, and an electric field is generated across each of modulating waveguide portions 2 and 3 in directions parallel to the Z-direction, to utilize the electrooptic constant $r_{33}$ having a large value. Further, electrodes 23 each provided between adjacent light modulating parts are all supplied with a common potential, for example, zero volt, and electrodes 24 each provided within a light modulating part are supplied with a voltage pattern for generating a desired optical pattern. Hence, the electrodes 24 are called "information generating electrodes". Further, in FIG. 5, reference numerals 23' and 24' designate pads for wire bonding, and 25 light emerging from the end face of the crystal plate 7. In the present embodiment, the electrode 23 having the common potential is provided between adjacent light modulating parts. Accordingly, even when a desired voltage pattern is applied to the information generating electrodes 24, an electric field for driving one of adjacent light modulating parts will scarcely escape to the other light modulating part, because of the electromagnetic shielding effect of the electrode 23.

Figure 6A:
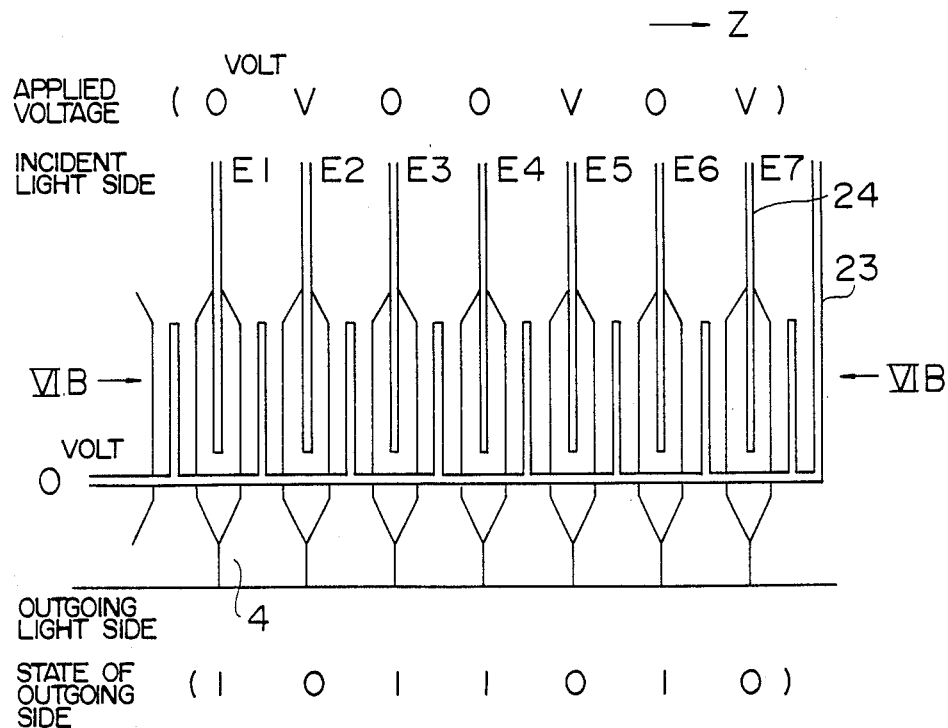
FIG. 6A is a schematic diagram for explaining the operation of the embodiment of FIG. 5.
Figure 6B:
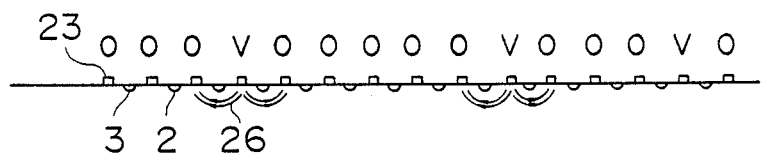
FIG. 6B is a diagram showing the generation of electric field based upon the electrode structure of FIG. 5, by a section taken along with the line VIB—VIB of FIG. 6A.

FIG. 6A is a schematic diagram for explaining a relation between a voltage pattern applied to the information generating electrodes 24 of the present embodiment and an optical pattern emerging from the end face of the crystal plate 7, and shows a case where a voltage pattern (OVOOVOV) is applied to the electrodes 24 to obtain an information pattern (1011010). FIG. 6B shows the cross section of the crystal plate 7 taken along the line VIB—VIB of FIG. 6A. As shown in FIG. 6B, electric lines of force 26 are generated in a light modulating part applied with a volt V.

Figure 7:
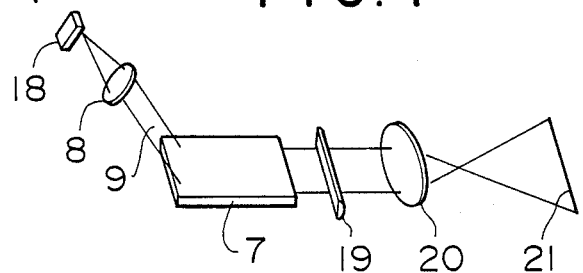
FIG. 7 is a schematic diagram showing an example of an optical information generating apparatus which includes a light modulating device array according to the present invention.

FIG. 7 shows an optical information generating apparatus which includes the embodiment of FIG. 1. Referring to FIG. 7, light rays emitted from a semiconductor laser 18 are collimated by a lens 8, and then impinge upon the device of FIG. 1. Light emerging from the end face of the crystal plate 7 spreads widely in the direction of thickness of the waveguide layer, and hence is converted by a cylindrical lens 19 into parallel light rays, which pass through a lens 20. Thus, optical information obtained by the embodiment is projected onto a screen 21 at desired magnification.

The operation of the embodiment of FIG. 5 having been explained with reference to FIGS. 6A and 6B is based upon an assumption that the length of the modulating waveguide portion 2 between the end of the input waveguide portion 1 and the head of the output waveguide portion 4 is equal to that of the modulating waveguide portion 3. In this case, when an information generating electrode 24 and the electrodes 23 have the same potential, a light modulating part provided with the electrode 24 generates light having a large intensity. In some cases, however, it is desirable that when an information generating electrode 24 and the electrodes 23 have the same potential, a light modulating part provided with the electrode 24 generates light having a small intensity. In these cases, a difference between the above length of the modulating waveguide portion 2 and that of the modulating waveguide portion 3 is made equal to $\lambda/2$ (where $\lambda$ is the effective wavelength of light traveling in a waveguide layer).

As has been explained in the foregoing, a light modulating device array according to the present invention can generate optical information including a large number of bits, though the array is small in size.

I claim:

1. A light modulating device array formed in a surface of a crystal plate with an electrooptic effect, comprising:
    an optical input coupling waveguide portion receiving a laser beam from a laser source;
    a tapered waveguide array portion for dividing a light beam from the optical input coupling waveguide portion into a plurality of parts; and
    a plurality of light modulating parts juxtaposed in a predetermined direction and receiving light beams from the tapered waveguide array portion, each of the light modulating parts including an input waveguide portion, a pair of modulating waveguide portions formed by bifurcating the input waveguide portion, and electrodes for controlling the modulating waveguide portions, whereby the intensity of light outputted from each light modulating part is controlled by enabling different voltages to be applied to each of the electrodes.

2. A light modulating device array according to claim 1, wherein means are provided for supplying electrodes provided on facing modulating waveguide portions of adjacent light modulating parts with the same potential and enabling electrodes provided on other modulating waveguide portions to be supplied with another potential.

3. A light modulating device array according to claim 1, wherein means are provided for supplying electrodes each provided between adjacent light modulating parts with the same potential and for enabling electrodes provided within the light modulating parts to be supplied with another potential.

4. A light modulating device array according to claim 1, wherein the difference between the lengths of the modulating waveguide portions formed by bifurcating the input waveguide is made equal to $\lambda/2$, where $\lambda$ is the effective wavelength of light in the waveguide portion.

5. A light modulating device array according to claim 1, wherein the light pattern generated at the end face of the crystal plate is imaged on a screen.

6. A light modulating device array formed in a surface of a crystal plate with an electrooptic effect, comprising:
    an optical input coupling waveguide receiving a laser beam from a laser source;
    an array of tapered waveguides arranged in parallel, each for passing a light beam from the optical input coupling waveguide towards a narrow end thereof;
    a plurality of light modulators juxtaposed in a predetermined direction and receiving light beams from the tapered waveguide array,
    each light modulator including an input waveguide coupled to said narrow end of the tapered waveguide, a pair of waveguides formed by bifurcating the input waveguide, and electrodes disposed on said pair of waveguides, for applying a control field thereto; and
    means connected to said electrodes, for applying the same potential to opposite ones of pairs of electrodes of adjacent light modulators and for enabling a different potential to be applied to others of said electrodes.

7. A light modulating device array according to claim 6, wherein said crystal is a Z-cut plate of $LiNbO_3$.

8. A light modulating device array formed in a surface of a crystal plate with an electrooptic effect, comprising:
    an optical input coupling waveguide receiving a laser beam from a laser source;
    an array of tapered waveguides arranged in parallel to each other, each tapered waveguide guiding a light beam from the optical input coupling waveguide towards a narrow end thereof; and
    a plurality of light modulators juxtaposed in a predetermined direction and receiving light beams from the tapered waveguide array, individually,
    each light modulator including an input waveguide, a pair of waveguides formed by bifurcating the input waveguide and electrodes for controlling the pair of waveguides one of which is disposed between said pair of waveguides, the other of said electrodes being disposed between adjacent light modulators and supplied with a common potential, the one of said electrodes being adapted to be supplied with a potential different than the common potential in accordance with a modulation pattern.

9. A light modulating device array according to claim 8, wherein said crystal plate is a y-cut plate of LiNbO$_3$.

10. A light modulating device array according to claim 8, further comprising means for applying the common potential to all the electrodes disposed between adjacent light modulators.

* * * * *